Sept. 12, 1967     LE ROY E. BARWICK     3,341,744
METER PEDESTAL
Filed Oct. 22, 1965
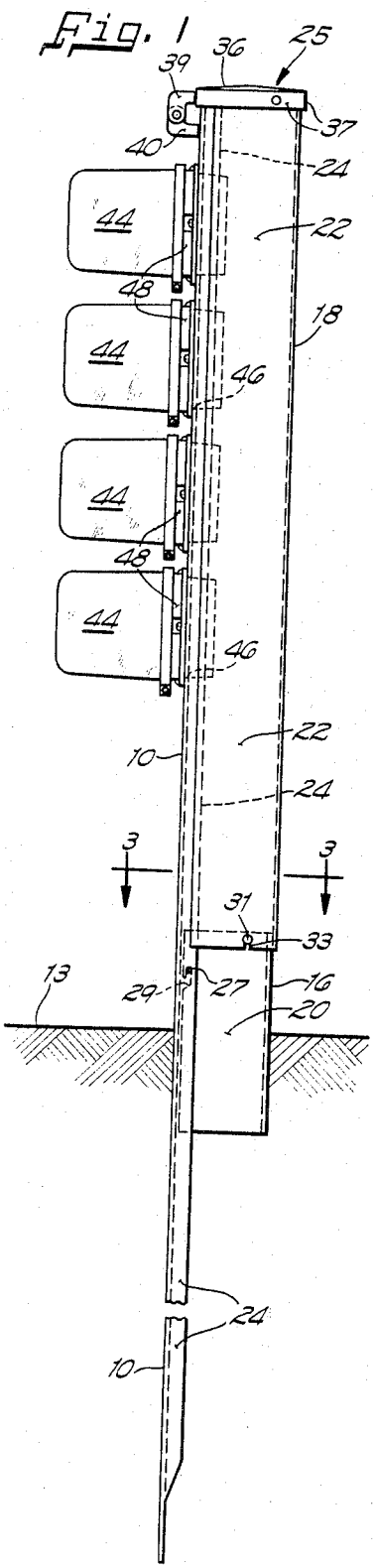
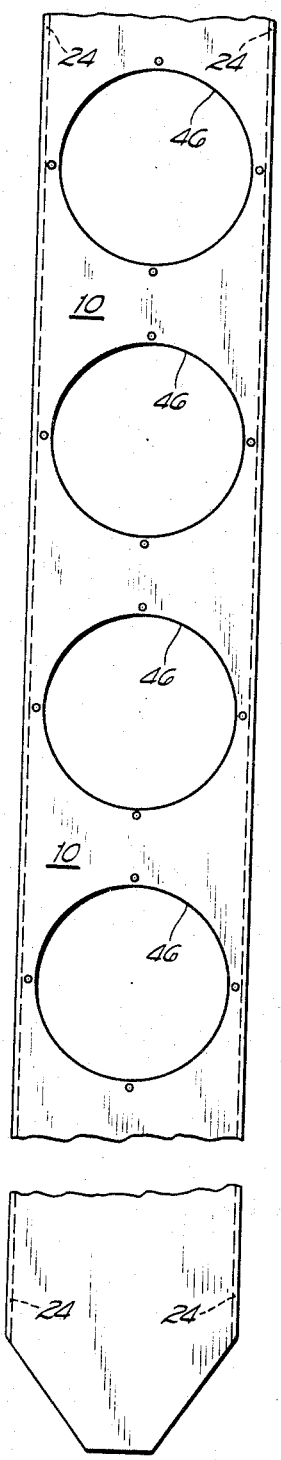
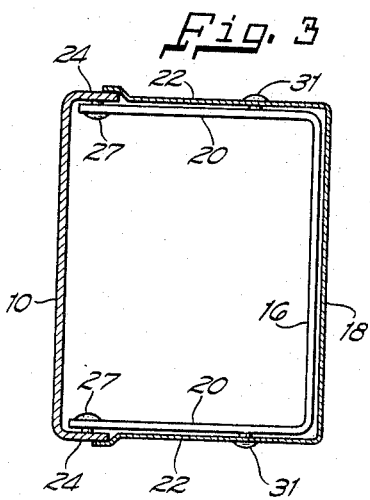
INVENTOR.
LeRoy E. Barwick
BY
Robert W. Raltieur
Attorney

United States Patent Office 3,341,744
Patented Sept. 12, 1967

3,341,744
METER PEDESTAL
Le Roy E. Barwick, East Stroudsburg, Pa., assignor to McGraw-Edison Company, Milwaukee, Wis., a corporation of Delaware
Filed Oct. 22, 1965, Ser. No. 500,762
2 Claims. (Cl. 317—106)

ABSTRACT OF THE DISCLOSURE

A metering pedestal comprising an elongate channel-shaped stake member having a plurality of apertures adjacent its upper end for receiving meter sockets therein and a generally channel-shaped ground cover member and a channel-shaped upper cover member releasably mounted on the stake member in an interlocking relation to prevent removal of the ground cover member prior to removal of the upper member and a cap for locking the upper housing member in position.

Background of the invention

This invention relates to terminal connecting pedestals for underground wiring systems and more particularly to an improved metering pedestal for underground distribution systems.

A principal object of undergound distribution systems is to eliminate aboveground wiring and connections. While underground distribution eliminates the power pole and aerial distribution lines, it is necessary to provide distribution equipment such as transformers, terminals locations, and metering facilities. Aboveground transformers can be suitably camouflaged or replaced by submerged units in underground vaults, and termination facilities for several customers and those of a plurality of utilities can be combined to reduce the amount of visible equipment while effecting economies with respect to initial installation. Likewise use of a pedestal for metering can be combined with termination facilities to place meters for several customers at one location for lower cost meter reading while eliminating the need for bringing the service aboveground at each customer's premises for metering purposes.

The present invention is directed to an improved metering pedestal for use particularly with underground distribution systems which may also be combined with termination facilities. The applicant's device includes a stake member of channel shaped section having meter sockets in the web portion to mount the meters at the side opposite that from which the flanges extend. A channel shaped ground line cover is secured to the stake with the flanges telescoped over those of the stake. An access cover including a cap portion extends upwardly from the ground line cover and is likewise of generally channel shaped section with the flange portions telescoped over stake member flanges. The access cover engages the ground line cover to prevent removal of the ground line cover when the access cover is in position and means are provided to lock the access cover to the stake to form an uninterrupted enclosure above the ground line with all junctions between stake, ground line cover, and access cover being in telescoped relation. This structure provides meter mountings which are firmly supported when the access cover is removed while affording all but total access to the terminal space at the rear of the meters from three sides of the enclosure when the access cover is removed.

It is an object of this invention to provide an improved metering pedestal for undergound distribution systems.

It is a further object of this invention to provide a metering pedestal which provides full support for the meters when the access covers are removed.

It is also an object of this invention to provide a metering pedestal of simple construction, which is easily locked and is resistant to tampering and which also provides a maximum access for service and maintenance.

Brief description of the drawings

FIGURE 1 is a side elevation of the meter pedestal of this invention with the stake portion interrupted below the ground line and certain interior details shown in phantom view;

FIGURE 2 is an elevation view of the stake portion with the lower portion interrupted and the top portion broken away showing the openings for receiving the meter sockets; and FIGURE 3 is a section view taken along line 3—3 of FIGURE 1.

Description of the preferred embodiment

Referring to the drawings, the stake member or support spur 10 of generally channel shaped configuration having shallow flange portions 24 provides the principal support for the pedestal. Although the stake member 10 is interrupted in both FIGURES 1 and 2, it is of sufficient length to provide an embedded lower portion below the ground line 13 to support the pedestal and the equipment mounted thereon, which in practice has been found to be a length of approximately three feet. The enclosure portion of the pedestal is completed by a ground line cover 16 and an upper access cover 18 which are each of relatively deep channel shaped section with flanges 20, 22 respectively extending toward and in telescoping relation with the flanges 24 of stake member 10 and one another and a cap member 25 which is rigidly connected to the upper end of access cover 18. A pair of coaxial rivets 27 are mounted on the interior surfaces of flanges 24 and extend toward one another to respectively provide shank portions between the rivet head and the inner flange surface for connecting the ground line cover 16.

Each ground line cover flange 20 is provided with an L-shaped slotted opening 29 extending from the vertical margin that serves as a bayonet connection to be received about the shank portions of the rivets 27. Ground line cover 16 is assembled by inserting or telescoping the marginal portions of flanges 20 within the flanges 24 of stake member 10 so that the L-shaped slot 29 is received about the shank portion of rivets 27 and sliding the ground line cover 16 downward so that the rivets in cooperation with the abutting relation between the flange margins of the ground line cover and the web portion of the stake prevent horizontal movement of the ground line cover away from the stake until the cover 16 is permitted to be moved upward to free itself from engagement with rivets 27. Access cover 18 of generally U-shaped section, has marginal edge surfaces of the flanges 22 thereof that telescope over the flanges 24 of the stake member 10 and ground line cover 16. The ground line cover is also provided with rivets 31 rigidly affixed thereto and projecting outwardly that provide a fixed shank portion between the head and the exterior surfaces of flanges 20. A slot 33 in the lower wall of each flange 22 of access cover 18 is received about the rivet shank of the ground line cover causing the ground line cover to be retained in the lower secured position with respect to stake member 10 and the interlocked relation simultaneously prevents the lower portion of access cover 18 from being moved horizontally away from its telescoping relation with the stake member. The cap 25 has a top wall 36 and a continuous downwardly depending flange 37 extending from the marginal edge of top wall 36 which telescopes over and is rigidly secured to the access cover upper marginal portion and is telescoped over the upper marginal edge portions of the stake when in the fully assembled condition. A pair of cooperating padlock bales 39, 40 respectively secured to cap 25 and to stake member 10 provide aligned apertures through which is received a padlock shackle (not shown) which functions to retain cap 25 and the upper portion of the access cover 18 in the secured position with respect to stake 10 while simultaneously functioning to prevent any upward movement of ground line cover 16 and thereby secure the integrity of the enclosure until such time as the padlock shackle is removed from the bales 39, 40.

The pedestal illustrated has provisions for mounting four meters 44 as shown by the stake member apertures 46 in FIGURE 2 which receive the meter sockets 48. When fewer than four meters are used with the pedestal shown, cover plates are provided over those openings in which a meter socket is not mounted to maintain the continuous wall about the enclosed space above the ground line.

When it is desired to have access to the rear of the meter sockets 48 or the other termination facilities that may be mounted within the pedestal enclosure, it is only necessary to remove the locking member from padlock bales 39, 40 whereupon the access cover may be lifted slightly upwardly and removed providing almost complete access from three sides of the space enclosed by the pedestal above the ground line cover. If necessary, ground line cover 16 may also be removed without the use of tools when access cover 18 has been disconnected from stake 10.

This pedestal unit could easily be modified to incorporate fuses and switches or breakers in junction with the meters or to provide a dual compartment structure for joint use for telephone and electrical services. Accordingly it will be appreciated that while a specific embodiment of the instant invention has been shown and described it is to be understood that variations may be made without departing from the spirit and scope of the invention as defined in the appended claims.

What is claimed is:

1. A metering pedestal for an underground power distribution system comprising a vertically extending stake member of generally U-shaped horizontal section having a lower end extending below the ground line to provide support for said pedestal; a plurality of apertures in the web portion of said stake member above said ground line; a plurality of meter sockets respectively mounted in said plurality of apertures each adapted to receive a meter projecting from said stake member in the direction opposite the direction in which the flange portions of said stake member project; a ground line cover having a lower end terminating below said ground line and an upper end above said ground line terminating below said stake member apertures with the vertical marginal edges of the flange portions of said ground line cover in closely telescoped relation with said flange portions of said stake member; an upper cover member of generally U-shaped horizontal section having a lower marginal edge portion in telescoped overlying relation to said ground line cover upper end portion and vertically extending marginal flange portions in telescoping relation with flange portions of said stake member; and a cap secured to one of said members and overlying the upper marginal edges of said members whereby said members, ground line cover and cap cooperate to form a substantially uninterrupted enclosure above said ground line, said ground line cover and said upper cover member each being releasably secured to said stake with said upper cover being interlocked with said ground line cover to prevent removal of said ground line cover from said stake when said upper cover member is secured to said stake and to prevent disconnection of said upper member from said ground line member without removal of said cap, and locking means for preventing removal of said cap and to prevent unauthorized removal of said upper cover and said ground line cover.

2. A metering pedestal for an underground distribution system comprising a stake member of generally U-shaped horizontal section having the lower end thereof embedded in the ground to provide the principal support for said pedestal; an aperture in the web portion of said U-shaped stake member above said ground line; meter means mounted in said aperture and carried by said stake member; a vertically extending ground line cover of generally U-shaped horizontal section having flange portions disposed in closely telescoped relation with the adjoining flange portions of said stake member, said ground line cover having a lower portion embedded in the ground and an upper portion above the ground line with the upper terminal portion terminating below said aperture; an upper cover member of generally U-shaped horizontal section having a lower marginal edge closely telescoped over said ground line cover and vertically extending marginal flange portions closely telescoped over the adjacent flange portions of said stake member; and cap means overlying the upper marginal edges of said stake member and said upper cover member whereby a substantially uninterrupted enclosure wall is provided above said ground line; said ground line cover and said upper cover member each being releasably secured to said stake with said upper cover being interconnected with said ground line cover to prevent disconnection of said ground line cover from said stake when said upper cover member is secured to said stake, and for preventing disconnection of said upper cover from said ground line cover when said cap means is in position, and locking means for preventing unauthorized removal of said cap means.

References Cited

UNITED STATES PATENTS

| | | | |
|---|---|---|---|
| 2,167,419 | 7/1939 | Heanes | 317—105 |
| 3,164,668 | 1/1965 | Skybal | 174—37 X |
| 3,185,757 | 5/1965 | Phillips | 174—45 |

ROBERT K. SCHAEFER, *Primary Examiner.*

D. SMITH, JR., *Assistant Examiner.*